United States Patent [19]

Sircar

[11] 4,329,158
[45] May 11, 1982

[54] AIR FRACTIONATION BY PRESSURE SWING ADSORPTION

[75] Inventor: Shivaji Sircar, Allentown, Pa.

[73] Assignee: Air Products and Chemicals, Inc., Allentown, Pa.

[21] Appl. No.: 159,086

[22] Filed: Jun. 13, 1980

[51] Int. Cl.³ .................................................. B01D 53/04
[52] U.S. Cl. ......................................... 55/26; 55/33; 55/62; 55/68; 55/75
[58] Field of Search .......................... 55/23–26, 55/33, 58, 62, 68, 74, 75

[56] References Cited

U.S. PATENT DOCUMENTS

| | | | |
|---|---|---|---|
| 2,944,627 | 7/1960 | Skarstrom | 55/33 |
| 3,085,379 | 4/1963 | Kiyonaga et al. | 55/23 |
| 3,140,931 | 7/1964 | McRobbie | 55/25 |
| 3,141,748 | 7/1964 | Hoke et al. | 55/58 X |
| 3,430,418 | 3/1969 | Wagner | 55/25 |
| 3,533,221 | 10/1970 | Tamura | 55/33 |
| 3,564,816 | 12/1968 | Batta | 55/26 |
| 3,636,679 | 1/1972 | Batta | 55/26 |
| 3,717,974 | 2/1973 | Batta | 55/58 |
| 3,738,087 | 6/1973 | McCombs | 55/58 |
| 3,788,037 | 1/1974 | Shell et al. | 55/58 |
| 3,796,022 | 3/1974 | Simonet et al. | 55/25 |
| 3,797,201 | 3/1974 | Tamura | 55/62 |
| 3,957,463 | 5/1976 | Drissel et al. | 55/25 |
| 3,973,931 | 8/1976 | Collins | 55/58 |
| 4,013,429 | 3/1977 | Sircar et al. | 55/33 |
| 4,026,680 | 5/1977 | Collins | 55/26 |

*Primary Examiner*—Robert H. Spitzer
*Attorney, Agent, or Firm*—E. Eugene Innis; James C. Simmons; Thomas G. Ryder

[57] ABSTRACT

Improved oxygen recovery in the operation of a pressure swing adsorption system for air fractionation is obtained by passng the air, freed of water and $CO_2$, through an adsorbent bed maintained at elevated temperature throughout the cycle and which is selective for retention of nitrogen, and consequent withdrawal of an oxygen-rich primary effluent product. In a preferred embodiment ambient air is passed through a pretreater section providing an adsorbent bed for removal of water and carbon dioxide. The thus purified air is compressed with consequent rise in temperature and then only partly cooled down by exchange with cooler desorbed and purged nitrogen-rich gas products withdrawn from the main adsorbent beds. These nitrogen-rich products thus heated by the exchange are employed in regenerating a water and carbon dioxide laden bed of the pretreater section. While the adsorption-desorption is operated in a pressure swing cycle, the pretreater section is operated in an independent thermal swing cycle. Alternatively, the feed air may be compressed prior to its introduction into the pretreater and the thus generated heat utilized by heat exchange for heating the purified air effluent to be fractionated.

18 Claims, 3 Drawing Figures

AIR FRACTIONATION BY PRESSURE SWING ADSORPTION

BACKGROUND OF THE INVENTION

The present invention relates to the fractionation of air by selective adsorption, and is particularly directed to a pressure swing adsorption system obtaining enhanced recovery of oxygen from ambient air.

Fractionation of air by pressure swing adsorption essentially consists of two key operations: an adsorption step, where the compressed feed air is contacted with a sorbent capable of selectively adsorbing one of the main constituents of air, and a regeneration step, where the adsorbed components are removed from the sorbent so that it can be reused. Commonly, alumino-silicate zeolites, which selectively adsorb $N_2$ from air, are employed as sorbents, thereby producing an $O_2$ enriched air stream during the adsorption step.

The common methods for sorbent regeneration are (i) desorption by pressure reduction and (ii) desorption by elution or purging. Depressurization at the end of the sorption stroke reduces the superatmospheric pressure inside the sorption columns causing desorption of the sorbed components along with removal of the void gases from the column. The purging step following depressurization consists of eluting the column with a gas stream rich in the non-adsorbed species of the air (usually $O_2$ enriched product gas) which reduces the partial pressure of the sorbed components in the voids of the column causing further desorption. Unfortunately, $O_2$ is lost by both of these regeneration procedures, thereby lowering the recovery of that species in the oxygen-enriched product gas.

Among the numerous systems found in the patent literature for production of an oxygen-enriched product gas from air by pressure swing adsorption (PSA) are those described in U.S. Pat. Nos. 2,944,627; 3,564,816; 3,636,679; 3,717,974 which utilize zeolite molecular sieves as selective adsorbents for nitrogen-oxygen separation. Also, it is known to employ a pre-treatment section comprising one or more adsorbent beds for removal of water and $CO_2$ from the feed prior to contact with the main adsorbent bed. Typical patents employing this feature include: U.S. Pat. Nos. 2,944,627; 3,140,931; 3,533,221; 3,796,022; 3,797,201; 3,957,463; 4,013,429. However, in these prior art systems, the air introduced into the main adsorption beds is at about ambient temperature, while a variation is proposed in U.S. Pat. No. 3,973,931. The latter patent discloses that, where the water-carbon dioxide impurities of the ambient air are removed by adsorbing these impurities in the feed inlet end of the same adsorbent column where the nitrogen-oxygen separation is carried out, an undesired cooling of that front section takes place. This is described as being responsible for the observed lower oxygen recovery of these processes in actual large scale application. Consequently, it is proposed in this patent to supply heat from an external source to only the inlet end section of the column sufficient to maintain the inlet end at least 20° F. (11° C.) warmer than without heating, but below 175° F. (79.4° C.). Similarly, a companion patent, U.S. Pat. No. 4,026,680, concerned with the same general problem of reduced temperature at the inlet end of the adsorption bed, uses metallic elements embedded in the column. This procedure is stated to have helped reduce the problem of the inlet end temperature depression and to result in improved oxygen recovery.

In the preliminary studies leading to the development of the present invention, two important characteristics of pressure swing adsorption systems for air separation were investigated. These were: (1) the temperature effect on the $N_2$ capacity of the adsorbent during adsorption from air at superatmospheric pressure and (2) the temperature effect on the quantity of oxygen purge gas needed for cleaning the adsorbent column after depressurizing the column to a near ambient pressure level. A synthetic mordenite molecular sieve was used in the tests conducted in this investigation.

It was found from these tests that both the $N_2$ capacity and the $O_2$ purge requirements decreased as the base column temperature increased, as was expected. However, there was a significant difference in the temperature coefficients of these two properties, not heretofore appreciated. That is, the temperature coefficient for the oxygen purge gas was found to be 4 to 10 times that for the nitrogen capacity, depending upon the conditions of operation.

Based on the foregoing exploratory tests, it was discovered that the performance of a pressure swing adsorption process (PSA) for air separation could be improved by operating the system at an elevated temperature throughout the columns. While in such operation a larger inventory of adsorbent may be required due to decrease in the adsorption capacity, the $O_2$ loss during the elution of the bed would be substantially reduced. In addition, it was found that the oxygen loss during the depressurization of the columns could also be reduced when operating these at an elevated base temperature throughout the bed and during the entire operating cycle. Also, it was discovered that the greater oxygen recovery would more than offset any anticipated increase in the capital cost, and thereby substantially improve the total economics of generating product oxygen by pressure swing adsorption, such for example, as an overall cost decrease in the order of 10 to 30%.

In addition to obtaining higher oxygen recovery, operation of the air fractionation process in accordance with the present invention provides another important advantage. By operating the pressure swing air fractionation system during the entire cycle at substantially the same elevated temperature at which the hot feed air is introduced thereto, the pretreatment of the feed air for removal of water and carbon dioxide prior to oxygen-nitrogen separation can be conveniently carried out by a thermal swing adsorption scheme because the hot desorbed nitrogen and the hot waste purge gas from the $N_2$—$O_2$ separation can be used for thermal regeneration of the pretreatment columns. Ordinarily, the adsorbent in the front section of the main $N_2$—$O_2$ separation column is utilized as a trap for $H_2O$ and $CO_2$, and a cyclic regeneration of this section is achieved during the depressurization and purging steps for the regeneration of the $N_2$—$O_2$ section. Such procedure for regeneration of the $H_2O$—$CO_2$ section is not very efficient because most of the desorption of water and carbon dioxide is achieved by the "purging effect" of the $H_2O$—$CO_2$ free gases from the $N_2$—$O_2$ separator section. A portion of the oxygen-enriched purge gas is thus often consumed only to clean the pretreatment section, particularly to remove water, and thereby decreases the amount of oxygen which can be recoverd as a dry product.

Thus, by operating at elevated temperature and in accordance with the particular steps of the present invention, one can judiciously utilize the heat of compression to supply the energy required for operation at the desired elevated temperature, as well as the energy needed for thermal swing removal of the $H_2O$ and $CO_2$ impurities in the feed air, such that the requirement for an external heat source is eliminated.

SUMMARY OF THE INVENTION

In accordance with the present invention, a pressure-swing adsorption process for production of product oxygen is provided which obtains substantially enhanced recovery of product oxygen. The invention includes the steps of (1) introducing the feed air previously freed of water and $CO_2$, at superatmospheric pressure and at elevated temperature, into a bed of adsorbent which is selective for adsorption of nitrogen, and which bed is maintained throughout the cycle and throughout its length at or near the elevated temperature of the feed air, and discharging an oxygen-enriched effluent gas from the bed;

(2) then reducing the pressure of the bed with simultaneous withdrawal of the desorbed and void gases from the bed in a direction opposite to that of feed air flow in step (1) until the pressure of the bed reaches a near ambient pressure level;

(3) then purging the bed with a part of the oxygen-enriched effluent gas in a direction opposite to that of the feed air flow;

(4) then repressuring the bed to an intermediate pressure level by introduction thereinto of the desorbed and void gases from one or more companion beds in the same direction as that of the feed air flow; and (5) finally, further repressuring the bed to about the designed adsorption pressure level by introduction therein of part of the high pressure oxygen-rich effluent in a direction opposite to that of the initial feed air flow.

In accordance with the preferred embodiment, the water and carbon dioxide impurities of the ambient air are removed by adsorbing them in a pretreatment bed prior to introduction of the pretreated air into the pressure swing adsorption section for separation of the oxygen and the nitrogen. The adsorption step in the pretreatment section is carried out at near ambient temperature either before the compression of the ambient air or after it. The regeneration of the adsorbent in the pretreatment beds is effected by simultaneously heating and purging the beds with nitrogen-rich desorbed and purge gas effluents from the pressure swing adsorption section of the system. Thus, the heat for regeneration of the pretreatment beds is obtained by at least partly recovering the heat of compression of the feed air. This is accomplished by heat exchanging the waste regenerating gas with the hot compressed feed air leaving the compressor.

DETAILED DESCRIPTION

Figure 1:
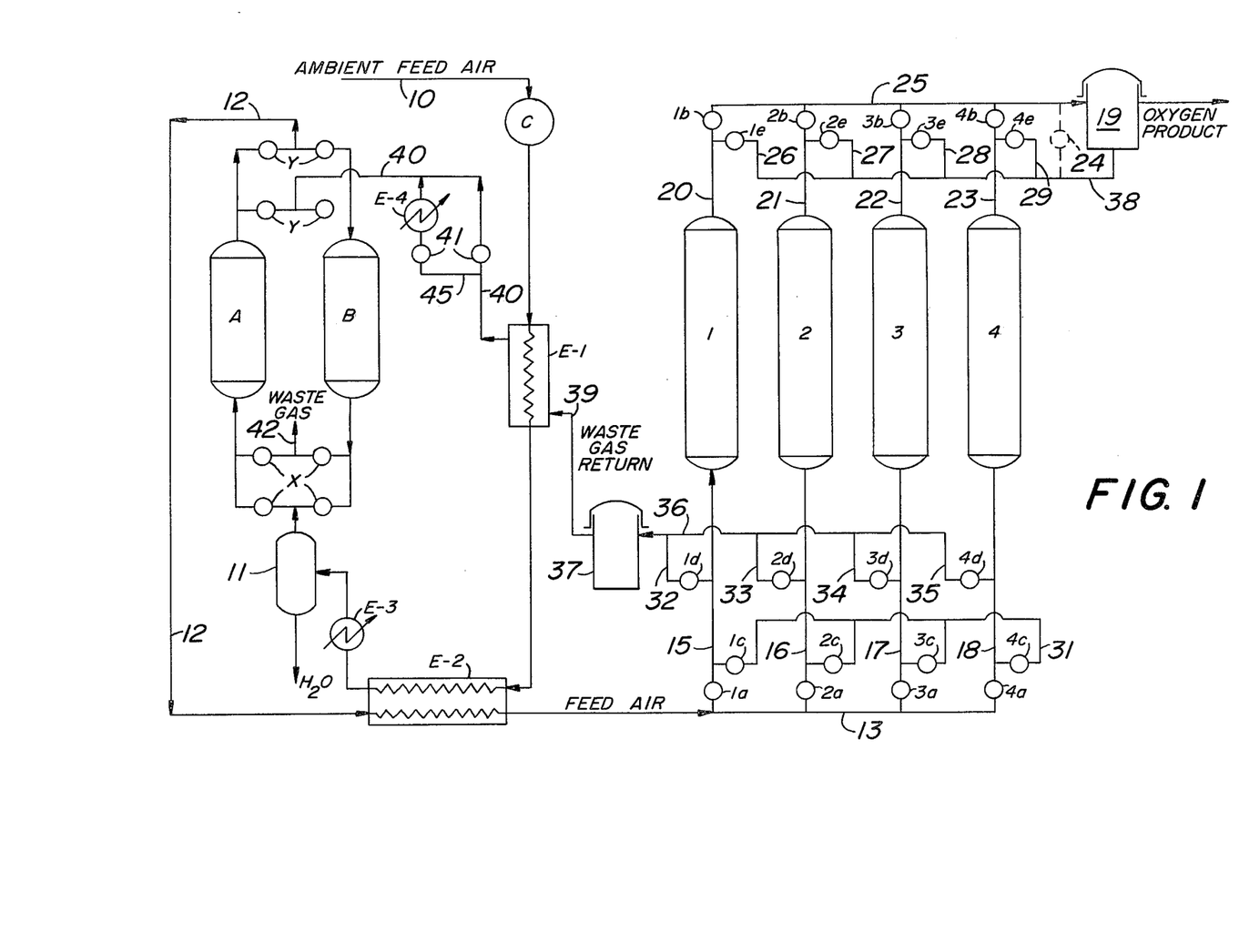
FIG. 1 is a schematic flow diagram of a system in accordance with one embodiment of the invention, using four main adsorber columns in the pressure swing adsorption section, in association with a particular gas pretreatment section operated in temperature swing mode.

Referring to FIG. 1, the ambient feed air is compressed in compressor C to a pressure, for example, in the order of 25 to 60 psig (about 2.7 to 5 bars), such that its discharge temperature is in the order of 300° to 570° F. (150°–300° C.). The pressurized and high temperature feed air is then cooled by being passed through a first heat exchanger E-1 and a second heat exchanger E-2, after which it may be further cooled in a conventional water cooler E-3 such that the major portion of the water vapor is condensed and separated in water separator 11. In the course of passing through heat exchanger E-1, the feed air stream may be lowered in temperature to the range of 130° to 190° F. (54°–88° C.), and further reduced in temperature in heat exchanger E-2 to a temperature in the order of 70° to 110° F. (21° to 43° C.). Thereafter, the feed air stream may be lowered to cooling water temperature in water condenser E-3 such that the feed air stream, dried of the major portion of the water vapor, is fed to one or other of pretreatment dryers A or B at essentially ambient temperature. Assuming that pretreatment column A is on the adsorption phase, the feed air stream is passed through the appropriate one of switch valves X, pretreatment bed A, and the appropriate one of switch valves Y from which it is discharged through line 12. Thereafter, the dried and carbon dioxide-free feed air stream is passed through line 12 to heat exchanger E-2 in which it is reheated to a temperature in the order of 90° to 180° F. (32° to 82° C.) in counter-current heat exchange with the high temperature feed air stream previously described.

The hot feed air stream from heat exchanger E-2 is then passed to manifold 13 from which it may be fed to one of the main adsorber columns 1–4 through appropriate lines 15, 16, 17, and 18 through respective valves 1a–4a. In the manner well known in the art, the feed air stream becomes enriched in oxygen during the adsorption step, and the oxygen product is discharged from whichever main column 1–4 is on the adsorption cycle through discharge lines 20, 21, 22 and 23. The discharge lines 20–23 are connected to a discharge manifold 25 leading to a product oxygen accumulator or surge tank 19. It will also be noted that branch lines 26–29 also connect discharge lines 20–23 with a second manifold 38 under the control of valves 1e–4e, respectively. Thus, by opening any one of the (e) valves with a (b) valve being closed, oxygen-rich purge gas may be admitted from manifold 38 into the selected main column in a direction opposite to that of the feed gas flow during adsorption. Alternatively it will be apparent that such flow of the oxygen-rich purge gas may be accomplished from discharge manifold 25 to manifold 38, and then through a branch line to the appropriate bed, by the addition of a valved line 24 interconnecting manifolds 25 and 38, in which event, surge tank 19 may be eliminated.

Flow of gas from one of the main columns to another of the main columns may be affected through a common manifold 31 in flow communication with each of lines 15–18 under the selective control of valves 1c–4c, respectively. For example, by opening valves 1c and 3c, while the other valves controlling these columns are closed, gas flow between these columns can be established from the column then at higher pressure to the one at lower pressure until the two columns are approximately pressure equalized.

Also in gas flow communication with each of main columns 1-4 is a waste gas discharge manifold 36 which is provided for depressurization and purge-step effluents. Such communication is provided through branch lines 32-35 under the control of valves 1d-4d, respectively. By opening valve 1d, for example, under appropriate conditions, waste gas can be withdrawn from column 1 through line 15, valve 1d, and branch line 32 into discharge manifold 36. In a similar manner, waste gas can be withdrawn from the other main columns under the control of associated valves 2d-4d.

The waste gas discharged into manifold 36 passes through a surge tank or accumulator 37, and then through line 39 to the previously described heat exchanger E-1. The returning waste gas, which is at the elevated temperature of main beds 1-4, is passed in indirect heat exchange with the hot compressed feed air stream so as to reduce the temperature of the feed air stream, as previously mentioned, while increasing the temperature of the waste return gas stream to a temperature, for example, in the order of 310° to 530° F. (154°-276° C.). If desired, the returning waste gas stream may have its temperature cooled slightly by passing a controlled portion thereof through exchanger E-4 via branch line 45 and under the control of regulating valves 41. Thereafter, the high temperature waste gas stream in line 40 is passed through the appropriate one of switch valves Y to regenerate the pretreatment column, for example, column B, which is under regeneration to remove the adsorbed water and carbon dioxide. Such waste gas stream, comprising the waste nitrogen and the desorbed water and carbon dioxide, is discharged from the cycle through the appropriate one of switch valves X and waste discharge line 42. Of course, it will be readily apparent to those skilled in the art that pretreatment columns A and B are alternately switched from their adsorption phase to the regeneration phase under the operation of switch valves X and Y in the manner well known in the water and carbon dioxide adsorption art.

After the regeneration of column A or B to the desired extent, that column is cooled to about ambient temperature before being switched back on stream for further adsorption of water and $CO_2$ from the feed air. Such cooling is accomplished, in the illustrated embodiment of FIG. 1, by passing all of the waste gas in line 40 through heat exchanger E-4 via branch line 45. Before resuming introduction of feed air into the regenerated and cooled A or B column, that column is brought to feed pressure level using a portion of the pretreated air effluent from the companion A or B column then on stream.

Having described the overall operation of the complete cycle, the unique steps of the pressure swing cycle in the operation of main columns 1-4 will now be described in detail. It will first be assumed that main column 1 is on stream for adsorption of nitrogen from the heated feed air stream supplied from manifold 13 through inlet line 15, and that the other main columns 2-4 are at various stages of the operating cycle as will hereinafter become apparent. The pretreated relatively hot feed air is introduced to adsorber 1 through open valve 1a, and oxygen product gas is withdrawn through discharge valve 1b until the mass transfer zone reaches the exit end of column 1, or somewhat short of it. Valves 1a and 1b are then closed and valve 1c is opened to carry out a series of depressurization steps. First, the void and desorbed (if any) gases from column 1 are transferred to column 3, which is then at lower pressure than column 1, through open valve 3c. When the pressure in these two vessels becomes approximately equal, valve 3c is closed and valve 4c opened, permitting gas flow into lower pressure column 4 and pressure equalizing that column with column 1. Valve 1c is then closed, and valve 1d is opened to carry out the final depressurization of vessel 1 to near ambient pressure level. The desorbed and void gases are discharged into manifold 36 through which these are conducted into surge tank 37. At the end of the depressurizing steps, valve 1e is opened and column 1 is purged at or near ambient pressure level with part of the oxygen product gas obtained from column 3, which is then on adsorption, or from surge tank 19. The effluent from column 1 during the purge step is withdrawn through valve 1d and passed into waste surge tank 37.

After column 1 has been cleaned to the desired level, valves 1d and 1e are closed, valve 1c is opened, and column 1 is pressure equalized with column 2, which column is then undergoing and second stage of depressurization, through valve 2c and line 31. Column 1 is then further pressurized by connecting it with column 3, which latter column is then on its first stage of depressurization, through open valve 3c. Finally, column 1 is pressurized to approximately the designed adsorption pressure level (feed pressure) with oxygen-enriched product gas, by closing valve 1c and opening valve 1e at a controlled rate. The oxygen product gas may be obtained from surge tank 19, or from column 4, which is then on the adsorption step in the cycle, or from both of these sources. Each of the main adsorber columns 1 to 4, in turn, will go through the same sequence of operations as that hereinbefore described.

Figure 2:
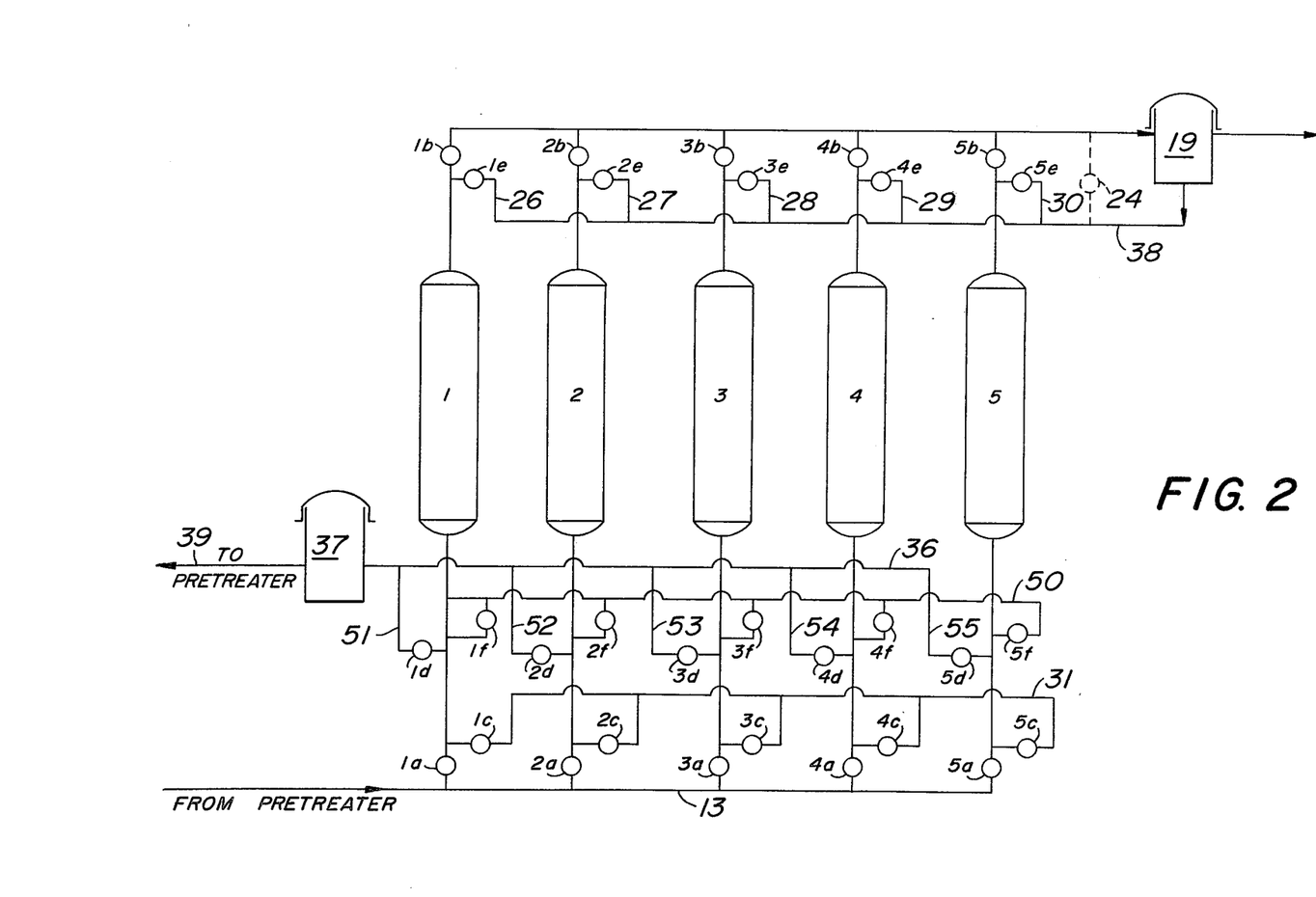
FIG. 2 is a schematic flow diagram of an alternative pressure swing adsorption section, using five main adsorber columns.

It will also be understood that, although the pretreated feed air is shown in FIGS. 1 and 2 as being introduced into the bottom of the main columns, optionally the introduction of the feed air can also be effected at the top of the main columns. The valves and piping will then be arranged accordingly so as to maintain the same relative directions of the different gas flows during the cycle with respect to that of the feed air flow.

In summary, the sequence to be followed in operating the main adsorber columns in the system of FIG. 1 is as follows:

(a) Adsorption—Flow the hot, pretreated feed air through a column of adsorbent, capable of selectivity removing $N_2$ from air, at the desired pressure and temperature. Withdraw part of the $O_2$ enriched exit gas as the product. Continue till the mass transfer front reaches the exit end of the column, or somewhat short of it.

(b) Depressurization I—At the end of the sorption step, discontinue feed flow through the column and depressurize the column countercurrent to the direction of step (a) to the first intermediate pressure level. Flow the exit gas (desorbed and void) during this step into another column which has undergone the first pressurization step and which is at the second intermediate pressure level.

(c) Depressurization II—Further depressurize the column countercurrent to the direction in step (a) to a second intermediate pressure level. Flow the exit gas into another column which has undergone the purge step and which is at the lowest pressure level of the cycle.

(d) Depressurization III—Further depressurize the column countercurrent to the direction of step (a) to the lowest pressure level in the cycle; i.e., approximately one atmosphere. Vent the exit gas during this step after flowing it through heat exchange and through the pretreatment column A or B then undergoing regeneration.

(e) Purge—Purge the column countercurrent to the direction of step (a) using a portion of the oxygen product gas obtained from another column undergoing step (a), or from tank 19, or from both. Flow the exit gas from the column during this step through heat exchange with the hot feed air in exchanger E-1, and then through the A or B Column then on regeneration.

(f) Repressurization—Repressurize the column to the second intermediate pressure level by connecting it to a column undergoing step (c). The direction of flow of gas into the column during this step is same as that of step (a).

(g) Repressurization II—Further repressurize the column to the first intermediate pressure level by transferring the gas into it from a column undergoing step (b). The direction of gas flow into the column in this case is also the same as in step (a).

(h) Repressurization III—Further repressurize the column to approximately the feed pressure level using a portion of the oxygen product gas from a column undergoing step (a), or from tank 19, or from both. The direction of gas flow into the column for this step is countercurrent to the direction of step (a).

(i) Repeat—At this point, the column is ready for repeating the cycle. Introduce feed and start from step (a).

It will be understood from the foregoing description of the operation that, while the main adsorber columns are operated in a pressure swing adsorption mode (PSA), the pretreater section operates in a thermal swing adsorption mode (TSA). The cycle time for the TSA pretreatment section is independent of that designed for the PSA main adsorber system. The pressure swing adsorption cycle may be relatively short, while the thermal swing cycle would ordinarily be on a much longer cycle time basis. A convenient cycle time for a main adsorber to go through the designed sequence of operations may be in the order of 3 to 16 minutes, while of the thermal swing pretreater operation may be in the order of four to eight hours.

Table 1 lists the step sequence of each main adsorption column in the FIG. 1 embodiment during an exemplary 16 minute cycle time. The positions of the valves during such a cycle are also shown in Table 1. It will be understood that the 16 minute total cycle time and the relative durations of each step given in these tables are presented by way of example since it will be apparent that other total times and relative times can be used.

In the embodiment of FIG. 1, described above, the main adsorber section for $N_2$—$O_2$ separation comprises four adsorber columns. It will be understood that a greater or lesser number of such columns can be employed with suitable adjustment of the time period for each step of the cycle. A system employing five main adsorption columns is illustrated in FIG. 2, wherein the columns are numbered 1 to 5 and the various valves associated with column 5 are labeled 5a through 5f. Other elements similar to those of FIG. 1 bear the same reference characters as in that figure.

In the preferred operation of the embodiment depicted in FIG. 2, three pressure equalization steps are used for conservation of oxygen in column voids at the end of the sorption stroke. Accordingly, an extra gas manifold 50 is provided connecting each of the adsorber columns 1 to 5 through valves 1f-5f to enable pressure equalization between any two columns. After the third pressure equalization step the column, which was depressured in that step, is brought to just above ambient pressure by further discharge of remaining gas therefrom through the appropriate valve 1d to 5d and the corresponding one of the branch line 51 to 55 connecting that column to manifold 36.

TABLE 1

| TIME | COLUMNS | | | | VALVE POSITIONS FOR SCHEME I — VALVE POSITION | | | | | | | | | | | | | | | | | | |
|---|---|---|---|---|---|---|---|---|---|---|---|---|---|---|---|---|---|---|---|---|---|---|---|
| Minutes | 1 | 2 | 3 | 4 | 1a | 1b | 1c | 1d | 1e | 2a | 2b | 2c | 2d | 2e | 3a | 3b | 3c | 3d | 3e | 4a | 4b | 4c | 4d | 4e |
| 0-1 | A | $P_2$ | $D_3$ | $D_1$ | O | O | C | C | C | C | C | O | C | C | C | C | C | O | C | C | C | O | C | C |
| 1-2 | A | $P_2$ | R | $D_1$ | O | O | C | C | C | C | C | O | C | C | C | C | C | O | O | C | C | O | C | C |
| 2-3 | A | $P_3$ | $P_1$ | $D_2$ | O | O | C | C | C | C | C | C | C | O | C | C | O | C | C | C | C | O | C | C |
| 3-4 | A | $P_3$ | $P_1$ | $D_2$ | O | O | C | C | C | C | C | C | C | O | C | C | O | C | C | C | C | O | C | C |
| 4-5 | $D_1$ | A | $P_2$ | $D_3$ | C | C | O | C | C | O | O | C | C | C | C | C | O | C | C | C | C | O | C |
| 5-6 | $D_1$ | A | $P_2$ | R | C | C | O | C | C | O | O | C | C | C | C | O | C | C | C | C | C | O | O |
| 6-7 | $D_2$ | A | $P_3$ | $P_1$ | C | C | O | C | C | O | O | C | C | C | C | C | C | O· | C | C | O | C | C | C |
| 7-8 | $D_2$ | A | $P_3$ | $P_1$ | C | C | O | C | C | O | O | C | C | C | C | C | C | O | C | C | O | C | C | C |
| 8-9 | $D_3$ | $D_1$ | A | $P_2$ | C | C | C | O | C | C | C | O | C | C | O | O | C | C | C | C | C | O | C | C |
| 9-10 | R | $D_1$ | A | $P_2$ | C | C | C | O | O | C | C | O | C | C | O | O | C | C | C | C | C | O | C | C |
| 10-11 | $P_1$ | $D_2$ | A | $P_3$ | C | C | C | O | C | C | C | C | O | C | C | O | O | C | C | C | C | C | C | O |
| 11-12 | $P_1$ | $D_2$ | A | $P_3$ | C | C | O | C | C | C | C | C | O | C | C | O | O | C | C | C | C | C | C | O |
| 12-13 | $P_2$ | $D_3$ | $D_1$ | A | C | C | O | C | C | C | C | C | O | C | C | C | O | C | O | O | C | C | O | C |
| 13-14 | $P_2$ | R | $D_1$ | A | C | C | O | C | C | C | C | C | O | O | C | C | O | C | O | O | C | C | O | C |
| 14-15 | $P_3$ | $P_1$ | $D_2$ | A | C | C | C | C | O | C | C | O | C | C | C | C | O | C | O | O | O | C | C | C |
| 15-16 | $P_3$ | $P_1$ | $D_2$ | A | C | C | C | C | O | C | C | O | C | C | C | C | O | C | O | O | O | C | C | C |

A = ADSORPTION
D = DEPRESSURIZATION
R = RINSE/PURGE
P = PRESSURIZATION
O = OPEN
C = CLOSED

The operation of the five column embodiment will be understood from the chart in Table 2, which sets out the steps in the operating cycle undergone by each of the columns in turn and the valve positions obtaining, according to one mode of operation in a 20 minute cycle.

A five adsorbent column system can be employed with only two pressure equalization steps. In that event manifold 50 and associated valves and lines can be omitted. The operation of each column during a complete cycle for this mode is given in Table 3 for an arbitrarily chosen five minute cycle as an example. In this mode of operation, each column undergoes the same sequence of process steps as described before. However, as will be seen from Table 3, the pretreated air feed is simultaneously introduced into two adsorbent columns at any given time during the cycle. This mode of operation results in reduced adsorbent inventory in each column and in reduction of the size of the gas storage or surge tanks as compared to a four column system of the same production capacity.

The pressure swing adsorption section can also be operated with only three adsorber columns wherein each column in turn undergoes the same sequence of process steps as in the other embodiments described, except that only one pressure equalization step is used in depressuring the bed after completion of the adsorption step.

TABLE 2

| TIME Minutes | COLUMNS 1 | 2 | 3 | 4 | 5 | VALVE POSITIONS 1a | 1b | 1c | 1d | 1e | 1f | 2a | 2b | 2c | 2d | 2e | 2f | 3a | 3b | 3c | 3d | 3e | 3f | 4a | 4b | 4c | 4d | 4e | 4f | 5a | 5b | 5c | 5d | 5e | 5f |
|---|---|---|---|---|---|---|---|---|---|---|---|---|---|---|---|---|---|---|---|---|---|---|---|---|---|---|---|---|---|---|---|---|---|---|---|
| 0-1 | A | $P_3$ | $P_1$ | $D_3$ | $D_1$ | O | O | C | C | C | C | C | C | O | C | C | C | C | C | O | C | C | O | C | C | C | C | C | O | C | C | O | C | C | C |
| 1-2 | A | $P_3$ | $P_1$ | $D_3$ | $D_1$ | O | O | C | C | C | C | C | C | O | C | C | C | C | C | O | C | C | C | C | C | C | C | C | O | C | C | O | C | C | C |
| 2-3 | A | $P_4$ | $P_1$ | $D_4$ | $D_1$ | O | O | C | C | C | C | C | C | C | C | C | C | C | C | O | C | C | C | C | C | C | C | C | O | C | C | O | C | C | C |
| 3-4 | A | $P_4$ | $P_2$ | R | $D_2$ | O | O | C | C | C | C | C | C | C | C | C | C | C | C | C | C | C | C | C | C | C | C | C | C | C | C | C | C | C | C |
| 4-5 | $D_1$ | A | $P_2$ | $P_1$ | $D_2$ | C | C | O | C | C | C | O | O | C | C | C | C | C | C | C | C | C | C | C | C | C | C | C | C | C | C | C | C | C | C |
| 5-6 | $D_1$ | A | $P_3$ | $P_1$ | $D_3$ | C | C | O | C | C | C | O | O | C | C | C | C | C | C | O | C | C | C | C | C | C | C | C | O | C | C | C | C | C | C |
| 6-7 | $D_2$ | A | $P_3$ | $P_1$ | $D_3$ | C | C | C | C | C | C | O | O | C | C | C | C | C | C | O | C | C | C | C | C | C | C | C | O | C | C | C | C | C | C |
| 7-8 | $D_2$ | A | $P_4$ | $P_2$ | R | C | C | C | C | C | C | O | O | C | C | C | C | C | C | C | C | C | C | C | C | C | C | C | C | C | C | C | C | C | C |
| 8-9 | $D_3$ | $D_1$ | A | $P_2$ | $P_1$ | C | C | C | O | C | C | C | C | O | C | C | C | O | O | C | C | C | C | C | C | C | C | C | C | C | C | C | C | C | C |
| 9-10 | $D_3$ | $D_1$ | A | $P_3$ | $P_1$ | C | C | C | O | C | C | C | C | O | C | C | C | O | O | C | C | C | C | C | C | C | C | C | O | C | C | C | C | C | C |
| 10-11 | $D_4$ | $D_2$ | A | $P_3$ | $P_1$ | C | C | C | C | C | C | C | C | C | C | C | C | O | O | C | C | C | C | C | C | C | C | C | O | C | C | C | C | C | C |
| 11-12 | R | $D_2$ | A | $P_4$ | $P_2$ | C | C | C | C | C | C | C | C | C | C | C | C | O | O | C | C | C | C | C | C | C | C | C | C | C | C | C | C | C | C |
| 12-13 | $P_1$ | $D_3$ | $D_1$ | A | $P_2$ | C | C | C | C | C | O | C | C | C | O | C | C | C | C | O | C | C | C | O | O | C | C | C | C | C | C | C | C | C | C |
| 13-14 | $P_1$ | $D_3$ | $D_1$ | A | $P_3$ | C | C | C | C | C | O | C | C | C | O | C | C | C | C | O | C | C | C | O | O | C | C | C | C | C | C | C | C | C | C |
| 14-15 | $P_2$ | $D_4$ | $D_2$ | A | $P_3$ | C | C | C | C | C | C | C | C | C | C | C | O | C | C | C | C | C | C | O | O | C | C | C | C | C | C | C | C | C | C |
| 15-16 | $P_2$ | R | $D_2$ | A | $P_4$ | C | C | C | C | C | C | C | C | C | C | C | O | C | C | C | C | C | C | O | O | C | C | C | C | C | C | C | C | C | C |
| 16-17 | $P_3$ | $P_1$ | $D_3$ | $D_1$ | A | C | C | C | C | C | C | C | C | C | C | C | C | C | C | C | O | C | C | C | C | C | O | C | C | O | O | C | C | C | C |
| 17-18 | $P_3$ | $P_1$ | $D_3$ | $D_1$ | A | C | C | C | C | C | C | C | C | C | C | C | C | C | C | C | O | C | C | C | C | C | O | C | C | O | O | C | C | C | C |
| 18-19 | $P_4$ | $P_2$ | $D_4$ | $D_2$ | A | C | C | C | C | C | C | C | C | C | C | C | C | C | C | C | C | C | C | C | C | C | O | C | C | O | O | C | C | C | C |
| 19-20 | $P_4$ | $P_2$ | R | $D_2$ | A | C | C | C | C | O | C | C | C | C | C | O | C | C | C | C | C | O | C | C | C | C | C | C | C | O | O | C | C | C | C |

A = ADSORPTION
D = DEPRESSURIZATION
R = RINSE
P = PRESSURIZATION
C = CLOSED
O = OPEN

TABLE 3

| TIME (Seconds) | COLUMNS 1 | 2 | 3 | 4 | 5 |
|---|---|---|---|---|---|
| 0–10 | A | $P_2$ | R | $D_1$ | A |
| 10–20 | A | $P_2$ | R | $D_1$ | A |
| 20–30 | A | $P_3$ | R | | A |
| 30–40 | A | $P_3$ | R | | A |
| 40–50 | A | $P_3$ | $P_1$ | $D_2$ | A |
| 50–60 | A | $P_3$ | | $D_3$ | A |
| 60–70 | A | A | $P_2$ | R | $D_1$ |
| 70–80 | A | A | $P_2$ | R | $D_1$ |
| 80–90 | A | A | $P_3$ | R | |
| 90–100 | A | A | $P_3$ | R | |
| 100–110 | A | A | $P_3$ | $P_1$ | $D_2$ |
| 110–120 | A | A | $P_3$ | | $D_3$ |
| 120–130 | $D_1$ | A | A | $P_2$ | R |
| 130–140 | $D_1$ | A | A | $P_2$ | R |
| 140–150 | | A | A | $P_3$ | R |
| 150–160 | | A | A | $P_3$ | R |
| 160–170 | $D_2$ | A | A | $P_3$ | $P_1$ |
| 170–180 | $D_3$ | A | A | $P_3$ | |
| 180–190 | R | $D_1$ | A | A | $P_2$ |
| 190–200 | R | $D_1$ | A | A | $P_2$ |
| 200–210 | R | | A | A | $P_3$ |
| 210–220 | R | | A | A | $P_3$ |
| 220–230 | $P_1$ | $D_2$ | A | A | $P_3$ |
| 230–240 | | $D_3$ | A | A | $P_3$ |
| 240–250 | $P_2$ | R | $D_1$ | A | A |
| 250–260 | $P_2$ | R | $D_1$ | A | A |
| 260–270 | $P_3$ | R | | A | A |
| 270–280 | $P_3$ | R | | A | A |
| 280–290 | $P_3$ | $P_1$ | $D_2$ | A | A |
| 290–300 | $P_3$ | | $D_3$ | A | A |

A = ADSORPTION
D = DEPRESSURIZATION
R = RINSE/PURGE
P = PRESSURIZATION

The operation of a three column pressure swing adsorption section will be understood from the examplary time chart in Table 4 based on a selected 12 minute cycle.

TABLE 4

| TIME (minutes) | COLUMN 1 | COLUMN 2 | COLUMN 3 |
|---|---|---|---|
| 0–1 | A | P-1 | D-1 |
| 1–2 | A | P-2 | D-2 |
| 2–3 | A | P-2 | R |
| 3–4 | A | P-2 | R |
| 4–5 | D-1 | A | P-1 |
| 5–6 | D-2 | A | P-2 |
| 6–7 | R | A | P-2 |
| 7–8 | R | A | P-2 |
| 8–9 | P-1 | D-1 | A |
| 9–10 | P-2 | D-2 | A |
| 10–11 | P-2 | R | A |
| 11–12 | P-2 | R | A |

A = ADSORPTION
D = DEPRESSURIZATION
R = RINSE/PURGE
P = PRESSURIZATION

Figure 3:
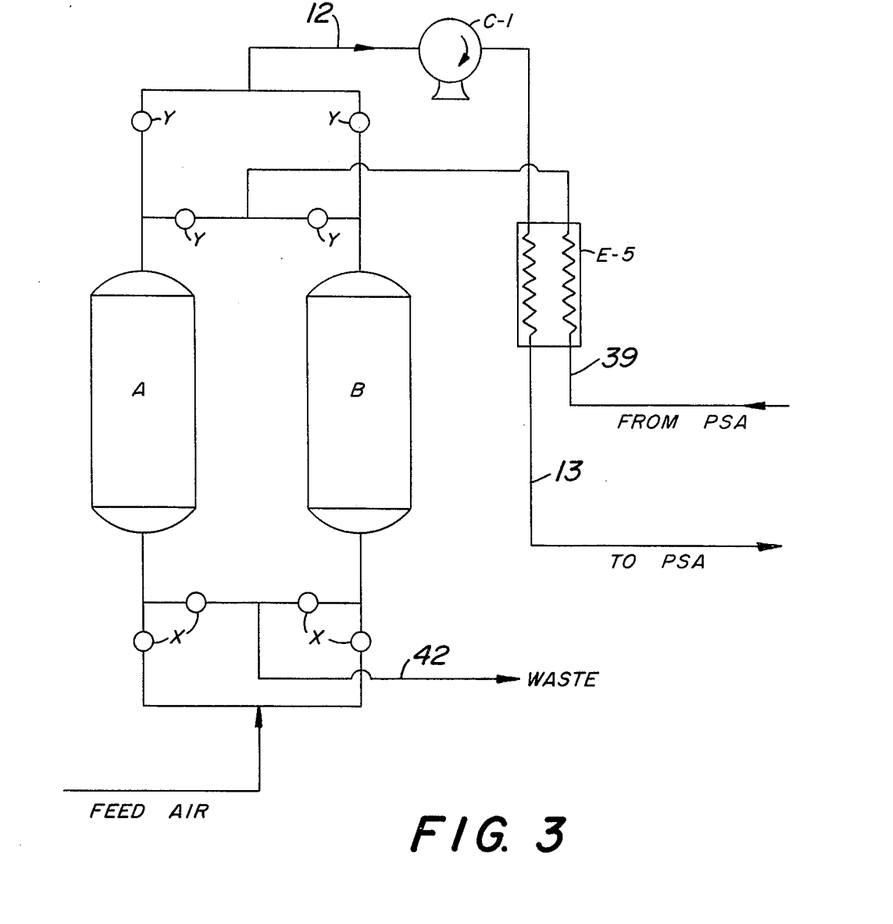
FIG. 3 is a schematic flow diagram of an alternative pretreatment section.

An alternative pretreater section for removal of water and $CO_2$ from the air feed is illustrated in FIG. 3. It will be understood that the pretreater arrangement shown in FIG. 1 can likewise be used with the pressure swing adsorption section of FIG. 2. On the other hand, the alternative pretreater section of FIG. 3 can be used with the pressure swing adsorption section of FIG. 1 or 2 or with any of the other modifications thereof described.

The pretreater section of FIG. 3 differs from that of FIG. 1 principally in the feature of compressing the air feed. In FIG. 1, as illustrated, the ambient air is compressed and cooled before introduction into a column A or B for removal of water and $CO_2$, the thus purified effluent being reheated before introduction into a main column of the PSA section for $O_2$—$N_2$ separation. In the alternative embodiment of FIG. 3, the feed air is introduced into column A or B at ambient pressure and the purified effluent is then compressed and its temperature adjusted by heat exchange to the desired base operating temperature for introduction into one of the columns of the main adsorption section.

In general, as to any of the embodiments depicted in FIGS. 1 to 3, the hot feed air, previously freed of $H_2O$ and $CO_2$, may be introduced into a main adsorber column of three, four or five columns $N_2$—$O_2$ separation section, at a pressure in the range of about 25 to 60 psig (1.7 to about 5 bars) and at a base temperature in the range of about 90° to 180° F. (32° to 82° C.), preferably above 90° F. The regeneration of the A and B columns of the pretreatment section by passage therethrough of the hot gas in line 40 from the PSA fractionation section, after heat exchange, may be in the order of 300° to 570° F. (150° to 300° C.), preferably 310° to 530° F. (154° to 276° C.). The fresh feed air may be introduced into the A or B column, then on stream for $H_2O$ and $CO_2$ removal, at near ambient temperature and pressure (FIG. 3 embodiment) or at a pressure in the range of 25 to 60 psig if intially compressed according to the alternative embodiment (FIG. 1).

In either of the embodiments of the invention, any available adsorbent capable of selectively removing nitrogen from its admixture with oxygen can be employed in the main adsorber columns. Among such, Zeolon 900 Na (a mordenite molecular sieve adsorbent) has proved acceptable. Zeolite 5A is among the other molecular sieve zeolites than can be used. In the pretreatment columns, to remove water and $CO_2$, there may be used any adsorbent that is selective for these components from air. Zeolite 13X or a combination of 13X and silica gel or alumina have proved acceptable.

Also, in either of the embodiments of the invention, the entire PSA section of the system comprising the main beds, the surge tanks, the pipings, the fittings and the valves may require adequate insulation so as to maintain the temperature of the section near the elevated base temperature of operation adiabatically. The adsorbents in the main columns may undergo a slight cyclic temperature variation during the adsorption-desorption steps but their temperatures will return to about the designed base temperature level at the beginning of each cycle under the steady state of operation.

The following improvements are achieved by operation according to the intention:

(a) Higher oxygen recovery in the oxygen-enriched product gas.
(b) Smaller power requirement per unit quantity of product.
(c) More efficient utilization of the adsorbent.
(d) More efficient utilization of the feed air pressure energy.
(e) Continuous operation of the feed air compressor.
(f) Continuous withdrawal of the oxygen-enriched product gas at slightly below the feed pressure level at a constant rate.

EXAMPLE

Set out below is an example of a typical operation in accordance with a preferred embodiment of the invention.

In a system comprising a pretreatment section and a PSA section as illustrated in FIG. 1, ambient air at 70°

F. (21° C.) and 0 psig (1 bar) is compressed to 30 psig (3.04 bar). Consequently, the temperature of the compressed gas stream rises to about 335° F. (168° C.). The hot compressed gas is then cooled to about 180° F. (82° C.) in exchanger E1 and then further cooled to about 107° F. (42° C.) in exchanger E2. Finally, the compressed gas is cooled to about 75° F. (24° C.) in exchanger E3 by heat exchanging with cooling water. A major portion of the water is thereby condensed out from the gas and removed in separator 11. The compressed gas at about 75° F. (24° C.) is then fed to one of the adsorbers in the pretreatment section for removal of the remaining water and the carbon dioxide. The $H_2O$ and $CO_2$-free effluent gas from the adsorber is heated to about 150° F. (65° C.), which is the base temperature of the operation of the PSA section, in exchanger E2 and fed to one of the columns of the PSA section which is maintained near 150° F. (65° C.) during the entire PSA cycle.

During the regeneration cycle of the adsorbers of the pretreatment section, the nitrogen enriched gas from the PSA section obtained as effluent during the purge step and the final counter current desorption step of the PSA adsorber, is first heated from the base temperature of about 150° F. (65° C.) to about 325° F. (164° C.) in exchanger E1 and fed to the pretreatment adsorber for supplying the heat of regeneration. The effluent from the adsorber carrying desorbed $H_2O$ and $CO_2$ is vented. After sufficient regeneration, the nitrogen enriched gas from exchanger E1 is cooled to about 75° F. (24° C.) in water cooler E4 and then fed to the regenerated pretreatment adsorber for cooling its temperature down to about 75° F. (24° C.).

The feeding of the pretreated feed air at about 30 psig (3.04 bar) and at about 150° F. (65° C.) is continued in the onstream adsorber of the PSA section (say column 1) until the $N_2$ adsorption front is about to breakthrough at the exit end of that column. An $O_2$ enriched product gas is withdrawn at about 30 psig (3.04 bar) from the column during the adsorption step via manifold 25. During this adsorption step, the temperature of the column 1 may go up slightly, as up to about 160° F., due to the adiabatic evolution of the heat of adsorption, but the temperature of the column will be restored to the base temperature during subsequent depressurizing and repressuring. The feed air is switched to column 2 when column 1 is about to breakthrough. Column 1 is then pressure equalized with column 3 via manifold 31 until the pressure levels in both columns approach a level of about 20.3 psig (2.38 bar). Column 1 is then further pressure equalized with column 4 via manifold 31 until the pressure levels in both columns approach a level of about 10.7 psig (1.73 bar). Column 1 is then depressurized to about 1 psig (1.07 bar by removing the voids and the desorbed gases via manifold 36. Column 1 is then purged with part of the $O_2$ enriched product gas at about 1 psig (1.07 bar) pressure level. The purge gas effluent from column 1 is also removed from the system via manifold 36. This completes the desorption steps for column 1. After purging, column 1 is pressure equalized with column 2 via manifold 31 and its pressure is raised to a level of about 10.7 psig (1.73 atm). Then column 1 is pressure equalized with column 3 via manifold 31 and its pressure is raised to a level of about 20.3 psig (2.38 atm). Finally, column 1 is pressurized to a level of about 30 psig (3.04 bar) by using a part of the $O_2$ enriched product via manifold 38. At the end of the pressurization steps, the temperature of the column 1 reaches the base temperature level of about 150° F. (65° C.) and it is ready to start a new cycle.

Columns 2, 3 and 4 undergo similar cyclic changes in pressures and temperatures as column 1 during the various steps of the cycle. The durations of the various steps for these columns and their relative sequence are described in Table 1 as an example.

A continuous laboratory apparatus consisting of four adsorbent columns in the PSA section was run using the above described conditions of operation. Each column contained 43 lbs. (19.5 kg) of Zeolon 900 Na mordenite adsorbent. The total cycle time of operation was 8 minutes. The feed air was supplied to the PSA section at a rate of 2.05 standard cubic feet per minute (58.0 standard liters per minute) and the $O_2$ enriched product containing 92.0% $O_2$ was withdrawn at a rate of 0.19 standard cubic feet per minute (5.30 standard liters per minute). The $O_2$ recovery from the feed air was 40.0%.

What is claimed:

1. In the method of producing oxygen-enriched air from ambient air, by pressure swing adsorption scheme, whereby nitrogen is selectively adsorbed on an adsorbent and an oxygen-enriched effluent stream is discharged as primary product, in a system comprising a plurality of main adsorbent beds operated in parallel in timed sequence, the improvement which comprises the following steps carried in recited cyclic sequence:
   (1) during an adsorption step introducing the feed air, previously freed of water and $CO_2$, at elevated temperature and at superatmospheric pressure into a main sorbent bed which is selective for retention of nitrogen and which is operated at near the elevated base temperature of the feed air throughout the bed during the entire cycle, while withdrawing from said bed an unadsorbed oxygen-enriched effluent stream as primary product,
   (2) interrupting the introduction of feed air to said bed at the conclusion of said adsorption step and reducing the pressure of the bed by withdrawal therefrom of a secondary gas stream including voids gas and desorbed gas rich in nitrogen, said secondary gas being withdrawn in a direction opposite to that of the initial feed air direction,
   (3) purging said bed to remove part of the residual sorbed nitrogen therefrom when said bed is at the reduced pressure, by passing through the bed counter to initial feed direction a part of the oxygen-enriched product gas which is at the base temperature of the main beds, p1 (4) repressuring the purged bed to an intermediate pressure level between that at step (1) and that at step (3), by flowing into the bed at the air inlet end thereof at least a portion of the secondary gas previously withdrawn from a composition bed at about the base temperature of the main beds,
   (5) further repressuring the bed to about the superatmospheric pressure level of step (1) by flowing thereinto a part of the oxygen-enriched product gas, said oxygen-enriched gas being introduced into said bed in a direction counter to that of step (1) above at about the base temperature of the main beds, and
   (6) repeating the recited sequence of steps beginning with step (1).

2. The improvement as defined in claim 1 wherein said feed air in step (1) is introduced at a temperature of at least about 90° F.

3. The improvement as defined in claim 1 wherein said feed air in step (1) is introduced at a temperature in the range of 90° to 180° F.

4. The improvement as defined in claim 3 wherein said temperature of the feed air in the recited range is obtained by compressing air previously freed of water and $CO_2$ and with consequent heating of said air, followed by cooling to said recited range at least in part by heat exchange with a cooler secondary gas stream comprising desorbed gases from the main beds.

5. The method as defined in claim 3 wherein said temperature of the feed air in the recited range is obtained by compressing ambient air prior to removal of water and $CO_2$ therefrom, pruifying the compressed air by removal of water and $CO_2$ therefrom, and utilizing the heat of such compression at least in part, to heat the thus purified air to the desired temperature in the recited range.

6. The improvement defined in claim 3 wherein said temperature of the feed air is obtained at least in part from the heat of compression of an air stream prior to or after removal of water and $CO_2$ therefrom.

7. The improvement as defined in claim 6 wherein said feed air freed of water and $CO_2$ is obtained by passing atmospheric air through a pretreatment section comprising a sorbent column selective in retention of water and $CO_2$ and removal of these components from air containing the same, said pretreatment section being operated in temperature swing mode and comprising at least two such sorbent columns operated in parallel such that while one column is removing the $H_2O$ and $CO_2$ by adsorption at near ambient temperature, another column containing sorbed $H_2O$ and $CO_2$ is being regenerated at higher than ambient temperature by introduction of nitrogen-rich secondary gas withdrawn from a main sorbent bed.

8. The improvement as defined in claim 7 wherein the effluent gas during the second stage of pressure reduction is at least in part passed through a heat exchanger for heat exchange with compressed hot feed air and then used as regenerating gas in a pretreatment column.

9. The improvement as defined in claim 7 wherein the purge gas effluent from the main columns during said purging step (3) is at least in part passed through a heat exchanger for heat exchange with compressed hot feed air and then used as regenerating gas for one of the pretreatment columns.

10. The improvement as defined in claim 1 wherein said system of parallel main sorbent beds comprises at least three such beds and said pressure reduction in step (2) is carried out in at least two stages, during the first such stage of pressure reduction the withdrawn gas being transferred to a second companion bed then at lower pressure until approximate pressure equalization between the beds is attained and during the last pressure reduction stage further withdrawn gas is removed from the system.

11. The improvement as defined in claim 1 wherein said system of parallel main sorbent beds comprises at least four such beds and said pressure reduction in step (2) is carried out in at least three stages, during the first stage of pressure reduction the withdrawn gas being transferred to a second companion bed then at lower pressure until approximate pressure equalization between the two beds is attained, during the second stage of pressure reduction the withdrawn gas being transferred to a third companion bed then at lower pressure until approximate pressure equalization between the beds is attained, and during the third stage of pressure reduction the withdrawn gas is removed from the system.

12. The improvement as defined in claim 11 wherein the effluent gas during the third stage of pressure reduction is at least in part passed through a heat exchanger for heat exchange with hot compressed feed air and then used as regenerating gas for a pretreatment column laden with sorbed water and $CO_2$ as a result of prior adsorption of these components from air prior to its introduction as feed air to a main sorbent bed.

13. The improvement as defined in claim 11 wherein the purge gas effluent withdrawn from the main columns during said purging step (3) is at least in part passed through a heat exchanger for heat exchange with compressed hot feed air and then used as regenerating gas for a pretreatment column laden with sorbed water and $CO_2$ as a result of prior adsorption of these components from air prior to its introduction as feed air to a main sorbent bed.

14. The improvement as defined in claim 1 wherein said system of parallel main sorbent beds comprises at least five such beds and the said pressure reduction in step (2) is carried out in at least four stages, during the first stage of pressure reduction the withdrawn gas being transferred to a second companion bed then at lower pressure until approximate pressure equalization between the two beds is attained, during the second stage of pressure reduction the withdrawn gas being transferred to a third companion bed then at lower pressure until approximate pressure equalization between the beds is attained, during the third stage of pressure reduction the withdrawn gas being transferred to a fourth companion bed then at lower pressure until approximate pressure equalization between the beds is attained, and during the fourth stage of pressure reduction the withdrawn gas is removed from the system.

15. The improvement as defined in claim 14 wherein the effluent gas during the fourth stage of pressure reduction is at least in part passed through a heat exchanger for heat exchange with hot compressed feed air and then used as regenerating gas for a pretreatment column laden with sorbed water and $CO_2$ as a result of prior adsorption of these components from air prior to its introduction as feed air to a main sorbent bed.

16. The improvement as defined in claim 14 wherein the purge gas effluent from the main columns during the said purging step (3) is at least in part passed through a heat exchanger for heat exchange with compressed hot feed air and then used as regenerating gas for a pretreatment column laden with sorbed water and $CO_2$ as a result of prior adsorption of these components from air prior to its introduction as feed air to a main sorbent bed.

17. The improvement as defined in claim 1 wherein said air feed of $H_2O$ and $CO_2$ is obtained by passing ambient air through a pretreatment section comprising an adsorbent bed selective in removal of $H_2O$ and $CO_2$ from an ambient air stream containing these components, and the thus purified air stream is heated by compression to a temperature level above that of the elevated base temperature at which said air is introduced into the main sorbent bed and thereafter cooled at least in part by heat exchange to said base temperature at which it is introduced into said main sorbent bed, the heat exchange being effected with cooler nitrogen-rich gas stream comprising effluent gases from said main columns during the depressurization and the purging steps and the said nitrogen-rich gas thus heated by said heat exchange utilized in regeneration of an adsorbent bed of said pretreater section containing sorbed $H_2O$ and $CO_2$.

18. The improvement as defined in claim 1 wherein said air freed of $H_2O$ and $CO_2$ is obtained by (a) compressing the ambient air to the superatmospheric pressure level of adsorption with consequent temperature rise of the air, (b) cooling the compressed air to near ambient temperature by a series of heat exchanges with cooler gases and other coolants, (c) passing the compressed gas at near ambient temperature through the adsorbent bed in the pretreatment section, and (d) heat exchanging the $H_2O$ and $CO_2$ free air effluent from the pretreatment bed with part of the hot feed gas to raise its temperature to the base temperature level at which said air is introduced into the main sorbent bed.

* * * * *